United States Patent
Porteous et al.

(10) Patent No.: US 7,169,306 B1
(45) Date of Patent: Jan. 30, 2007

(54) VERSATILE PRE-THICKENED AEROBIC DIGESTER SYSTEM

(75) Inventors: James Porteous, Austin, TX (US); Elena Bailey, Austin, TX (US)

(73) Assignee: Eimco Water Technologies LLC, Salt Lake City, UT (US)

( * ) Notice: Subject to any disclaimer, the term of this patent is extended or adjusted under 35 U.S.C. 154(b) by 172 days.

(21) Appl. No.: 10/903,243

(22) Filed: Jul. 30, 2004

(51) Int. Cl.
*C02F 3/00* (2006.01)

(52) U.S. Cl. ............... 210/620; 210/621; 210/622; 210/623

(58) Field of Classification Search ............ 210/620, 210/621, 622, 623
See application file for complete search history.

(56) References Cited

U.S. PATENT DOCUMENTS 4,578,188 A * 3/1986 Cousino ............... 405/87
5,639,371 A * 6/1997 Loy et al. ............... 210/614
5,972,220 A * 10/1999 Bailey ............... 210/605

* cited by examiner

*Primary Examiner*—Chester T. Barry
(74) *Attorney, Agent, or Firm*—Thomas M. Freiburger

(57) ABSTRACT

An aerobic digester system in a wastewater treatment plant is made more versatile for different conditions by addition of an equalizer basin or in some embodiments, a bypass pipe. If infeed is received from a sequential batch reactor or from a concentrated septage, for example, the equalizer basin can contain one batch, and then deliver the batch out incrementally to a gravity thickener basin. The equalizer basin also enables the gravity thickener of the system to be removed from service when needed, providing increased flexibility for the system. Importantly, the equalizer or bypass enables versatile modes of operation so that a plant designed for a larger, later flow can operate at an initially low flow or at several levels of flow before reaching the largest design flow. This applies to other conditions of variable flow as well such as seasonal.

4 Claims, 2 Drawing Sheets

VERSATILE PRE-THICKENED AEROBIC DIGESTER SYSTEM

BACKGROUND OF THE INVENTION

The invention relates to wastewater treatment systems, and more particularly to pre-thickened aerobic digester systems.

Enviroquip's U.S. Pat. No. 5,972,220 describes a pre-thickened aerobic digester (P.A.D.) G system. This system eliminated the need to turn oxygen on and off in the digesters, by performing denitrification in the gravity thickener, and enabled class B sludge to be achieved in a lesser time than in prior P.A.D. systems. Although the system works very well, there can be several problems: if the wastewater comes in from a sequential batch reactor, or SBR, or septage, the batches come infrequently, e.g. eight times per day (assuming from two SBRs), or less frequently in the case of septage, which is concentrated. The basic P.A.D. G system is designed for receiving up to 24 batches per day.

Another problem is that the gravity thickener may need to be taken out of service, for mechanical repairs, cleaning, etc. There was no way to do this prior to the new development described herein, for the P.A.D. G system.

A third issue is low flow in a system designed for a much larger flow. This is typical of a system designed for future expansion, i.e. to serve a larger area in the future. With a flow rate which is only a fraction of the design flow rate, the P.A.D. G system simply does not receive enough sludge to denitrify the sludge. The thickener is much larger than needed for these circumstances, and the sludge will not settle adequately. Sludge will tend to float up to the surface, and the supernatant is not sufficiently clear; only about 1% to 1½% sludge concentration is possible in many such situations.

SUMMARY OF THE INVENTION

The new system adds an equalizer basin, or in some embodiments, simply a bypass pipe to by pass the premix and gravity thickener. The equalizer is the basin into which the wastewater or waste sludge first enters. It is then delivered into the premix basin, which is open to the gravity thickener, usually by a large pipe or by direct connection. The equalizer, if included, is large enough to store one batch from the SBRs, and can hold batches of septage.

Another benefit of the equalizer basin or a bypass pipe, is in enabling the gravity thickener to be removed from service. When the thickener needs to be serviced, the premix is also taken out of service, since they are continuously connected. The equalizer basin or bypass pipe receives the influent and feeds it into digester 1, which in turn feeds sludge into digester 2, and it is held in the digesters until such time as the gravity thickener and premix are put back online. In this mode the system operates in the same manner as a low flow situation described below.

The third mode of operation using the equalizer is for the low flow situation referred to above. A bypass pipe can also be used for this condition. The object is to obtain a sufficiently clear supernatant, and to achieve class B sludge in a relatively efficient way. Settling of solids in the gravity thickener in these conditions is not sufficient, achieving only about 1% to 1-½% concentration, and the supernatant from the thickener is not clear enough because of the inadequacy of settling. With the equalizer basin in the system, however, sludge simply is moved directly from the equalizer into digester 1 and then digester 2. In this mode, the aeration must be turned on and off in the digesters. The digester basins are not full, and there is plenty of detention time in the digesters with this low flow, and with the digesters being used in series. The digesters are not sequentially put in isolation, as in the P.A.D. G system.

Following sufficient detention time in the digesters, the sludge is then moved to be post-thickened. It is moved from digester 2 to the premix basin, thus to the gravity thickener. Since class B sludge has already been achieved, the sludge will now adequately settle and will produce a clear supernatant.

Note that in the mode of operation just described, denitrification is achieved in the digesters, not in the thickener. No water will go over the weir from the digester, because of the low flow situation.

It is thus among the objects of the invention to improve the versatility and efficiency of pre-thickened aerobic digester systems, through the provision of an equalizer basin and through specific modes of operation using that basin, or a bypass pipe, as described above. These and other objects, advantages and features of the invention will be apparent from the following description of preferred embodiments, considered along with the accompanying drawings.

DESCRIPTION OF PREFERRED EMBODIMENTS

Figure 1:
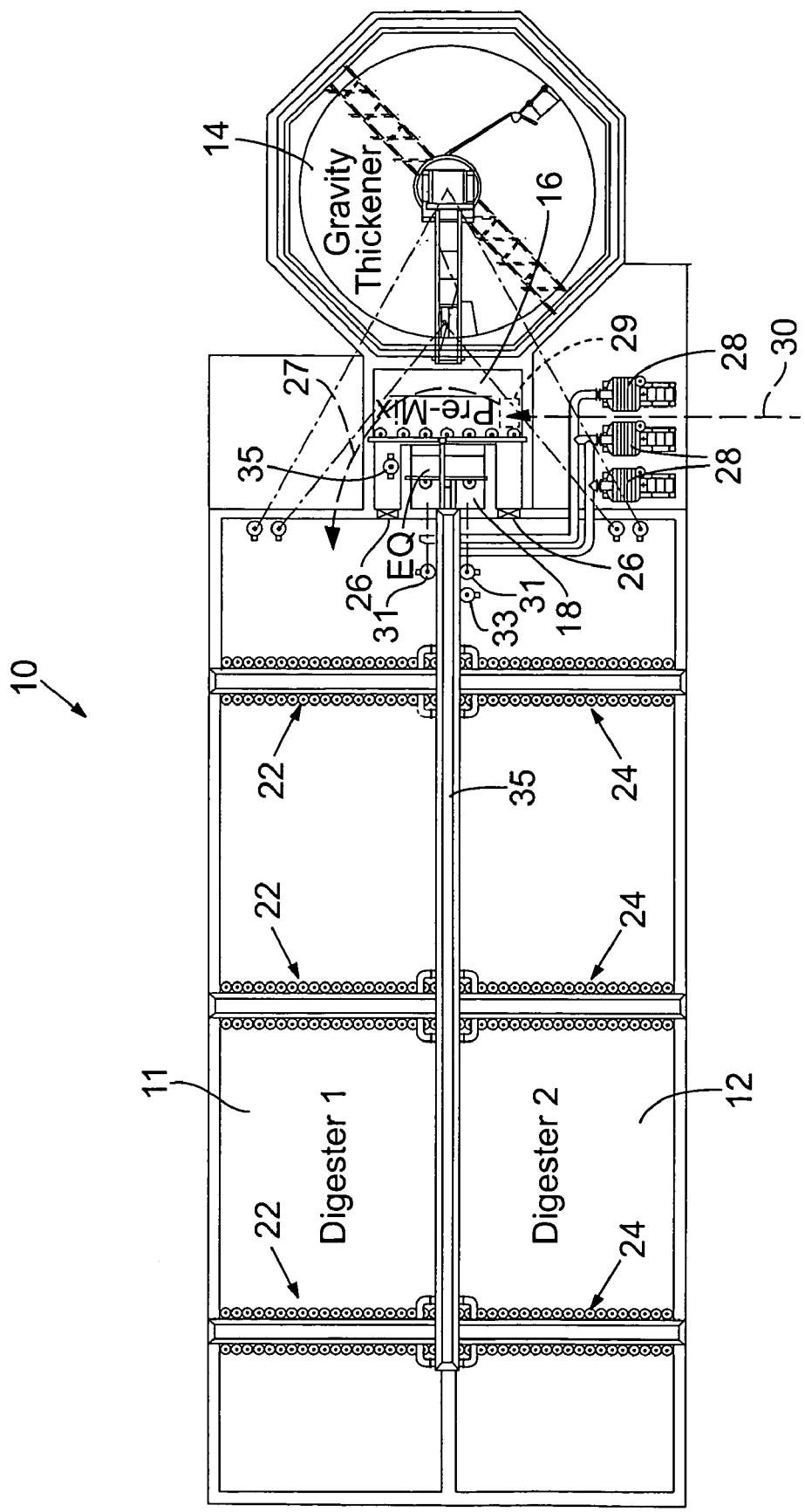
FIG. 1 is a plan view showing schematically an aerobic digester system which includes an equalizer basin and the other equipment according to the invention.

In the drawings, FIG. 1 shows a system 10 which has two digesters 11 and 12, denoted Digester 1 and Digester 2. The system also includes a large gravity thickener 14, a premix basin 16 which is connected to the gravity thickener and an equalizer or equalization basin 18. The system 10 is a versatile, adaptable aerobic digester system, operable under most conditions as a pre-thickened aerobic digester system such as described in the applicant's U.S. Pat. No. 5,972,220 noted above and incorporated herein by reference. As discussed above, the system 10 is designed to handle different levels of inflow to the plant, from an initial very low flow, to an intermediate level of flow at which the system typically operates as a P.A.D. system such as described in the '220 patent, and potentially to an even higher level of flow. In essence the system 10 is modular; the basic system can be built initially when a very low flow is expected, such as for a growing residential area, and further components and different functionality can be implemented as the level of inflow grows. The system also is advantageously used in a seasonal community with much higher flows in some seasons than in others, and in a situation wherein septage (highly concentrated waste, as from septic tanks) is received regularly or from time to time.

The drawing also shows a series of air diffusers, at 22 and 24 in Digester 1 and Digester 2. This aeration equipment is used for pre-thickened aerobic digestion, for the in-loop digester as outlined in the '220 patent discussed above, where one digester is in loop and the other is isolated at any given time, and wherein denitrification occurs along with thickening, in the gravity thickener 14. Digester aeration in both digesters is needed for other modes if operation, as discussed below.

Also shown as included in the system 10 are two downwardly operating weir gates 26, from each digester to the premix basin 16. These weir gates, or one or the other, are opened for several modes of operation as explained below. Other types of flow channels can be used instead of weir gates Also shown in the drawings are blowers 28, to supply air to the diffusers 22 and 24 in modes when needed, also as explained below.

The equalizer basin 18 is added to a system whose components otherwise are generally similar to those of the '220 patent described above, and provides for great versatility and adaptability of the system, as do the different modes of operation described herein. For some purposes the equalizer can be replaced by a bypass pipe connected to selectively bypass the premix 16 and gravity thickener 14, and to send incoming wastewater directly to one of the digesters. A bypass pipe is shown as an alternative at 27 in dashed lines, fed as needed by a control valve 29, which receives inflow 30 that will go to the premix 16 when bypass is not desired. Such a bypass pipe is sufficient for bypassing the premix/gravity thickener when being serviced, and for a versatile system wherein flow rate is seasonal or grows over the years. An example of the latter type system is now described.

Figure 2:
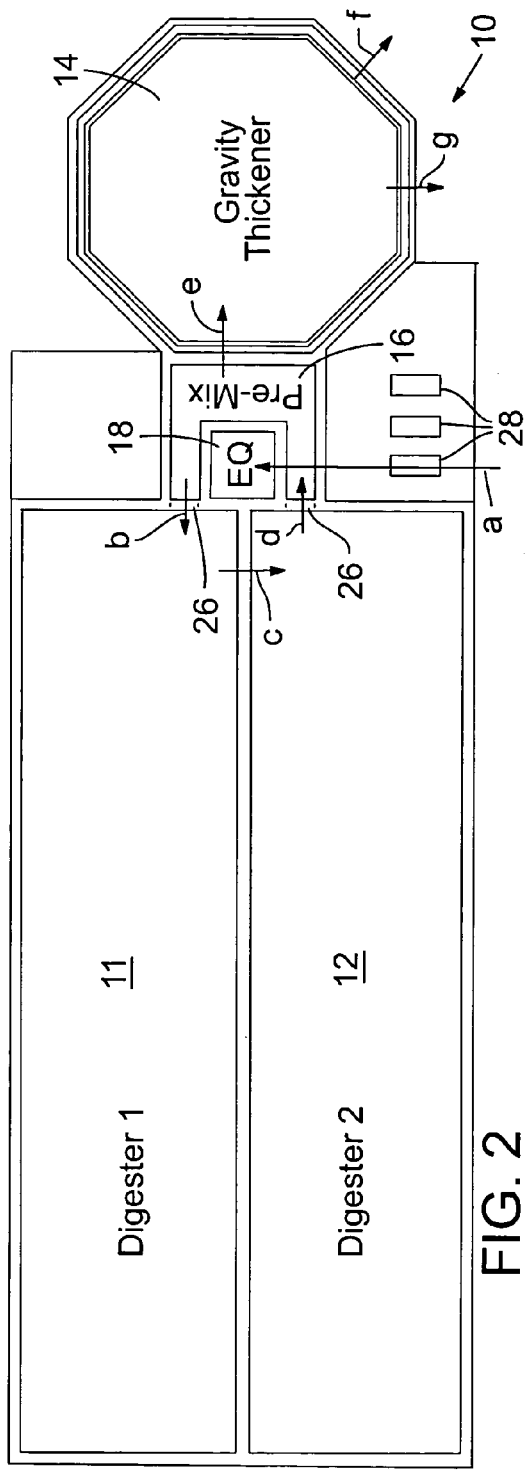
FIGS. 2 and 3 are similar schematic plan views demonstrating different modes of operation of an aerobic digester system of the invention.
Figure 3:
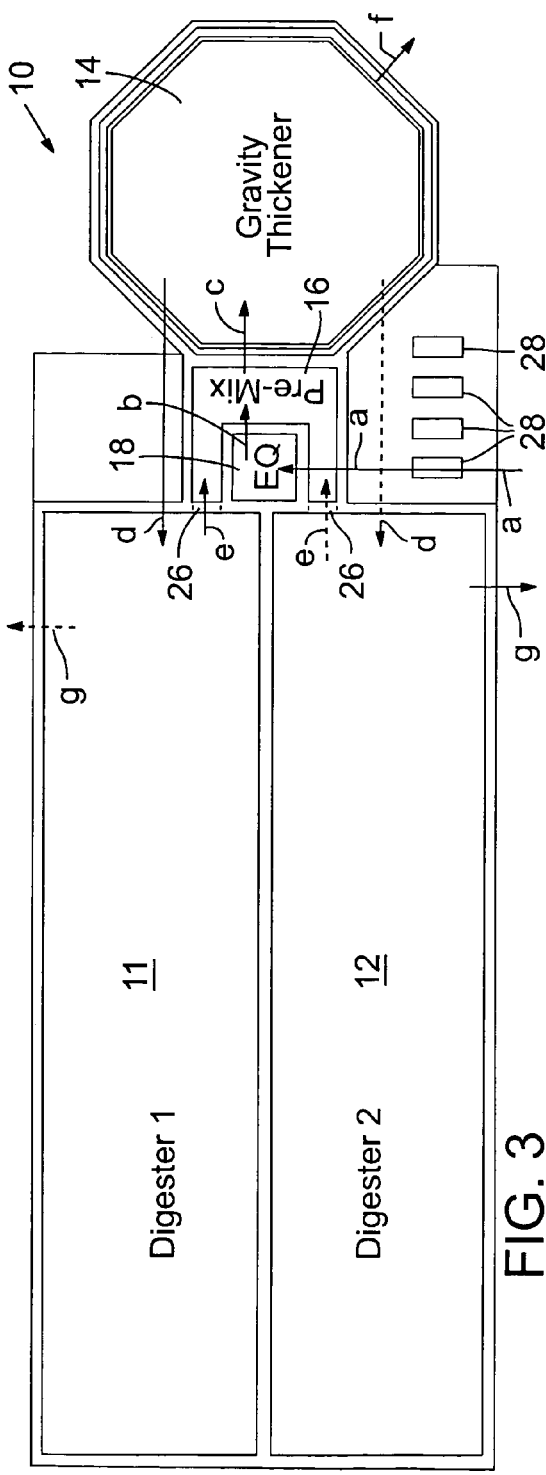

Examples are now given of the different modes or phases of operation of the system 10 of the invention. FIGS. 2 and 3 show the system in different stages, in modes of operation which reflect different flows into the system. These drawings are not to scale. The following table outlines Phases A, B and C for different conditions of flow into the system (such as for serving a growing number of residents, as noted above). The equalizer basin (EQ) is shown n these phases of operation, but it is understood that the bypass pipe 27 (FIG. 1) can be implemented instead.

Phase A
Condition: 4750 lbs/day 1.5 MGD—Design
a. Influent to EQ basin
b. EQ to Digester 1
c. Digester 1 to Digester 2
d. Digester 2 to Pre-Mix
e. Pre-mix to gravity thickener
f. Supernatant back to head of plant
g. Finished product Class B
Phase B
Condition: 6255 lbs/day 3.0 MGD—Minimum
(At this flow rate operate either as in Stage I or Stage II, FIG. 2 or FIG. 3)
Phase C
Condition: 9500 lbs/day 3.0 MGD—Design
a. Influent to EQ basin
b. EQ to pre-mix
c. Pre-mix to gravity thickener
d. Gravity thickener to Digester 1 or 2 (in loop)
e. Digester 1 or Digester 2 isolated, recycle to pre-mix with in-loop digester
f. Supernatant back to head of plant
g. Finished product Class B from isolated digester In this example, the equalizer basin 18 may be approximately of a size of 7 feet by 10 feet with a depth from about 17 feet to 22 feet. The pre-mix basin may be about 18½ feet by 20 feet in pre-mix volume being lessened by the presence of the equalizer basin in the configuration shown. Digesters 1 and 2 in this example may be each about 30 feet by 130 feet, depth approximately 22 feet. The gravity thickener 14 may be approximately 45 feet in diameter, with a depth of about 16 feet and at the same water level as a the pre-mix basin 18. These valves are only exemplary. This example is to serve a changing flow condition which can vary from about 1.5 million gallons per day (MGD), which is about 4750 lbs./day, to about 3.0 MGD, which is about 9500 lbs./day. These flow volumes are also shown on the table above.

The system of the invention in the specific example given provides the capability to operate a P.A.D. G (pre-thickened aerobic digestion, gravity thickening) system up to about 3 MGD. The example shown here can use existing structures of a P.A.D. system and all equipment will be used from Phase A through Phase C. Thus, the system offers maximum use of capital cost from the owner's perspective, for a flow ranging, in this example, from about 4750 lbs./day to about 9500 lbs./day of solids, a two to one range or greater (Phase A flow could be lower). The three phases outlined in the table above represent different conditions, i.e. volumes, of flow. The drawings of FIGS. 2 and 3 show different stages or modes of operation, as will be described. In FIG. 2, Stage I, Phase A or B could use this mode of operation. In FIG. 3, Stage II, Phase B or C could operate in this mode.

In FIG. 2, in this stage it is assumed that the flow to the plant is low, and since the upstream process provides a very long detention time, by the time the waste activated sludge (WAS) arrives at the pre-mix basin there would be a very low dosage of carbon. If a plant were to operate in the normal P.A.D. mode, then nitrified sludge from the digester in loop would be mixed with the raw WAS in pre-mix basin 16. The WAS is considered the carbon source, and together this mix goes to the gravity thickener 14, which preferably acts also as an anoxic stage and where denitrification occurs along with thickening. However, if the carbon source is very low, good settling in the thickener is inhibited. As a result, during the low flow as indicated in Phase A and possibly Phase B, all flow presented to the system is directed into the equalization basin 18, and from there it is transferred to Digester 1 (11) preferably via an airlift 31 (or by other transfer means, or the bypass pipe 27 is used in absence of an equalizer basin 18), then to Digester 2 (12), which may again be using an airlift 33, and then from there the sludge goes over a weir gate 26 (or other transfer channel or means) between Digester 2 and the pre-mix basin 16, entering the pre-mix basin and finally ending up in the gravity thickener 14. In this mode of operation, decanting of liquid can be provided at both digesters (through the use of telescoping valves, for example), and the blowers will operate at low dissolved oxygen to provide simultaneous nitrification and denitrification (generally as described in U.S. Pat. No. 5,906,746). Final Class B sludge will be removed from the gravity thickener in this case. In this low flow phase, even at 1–2% solids concentration, there is sufficient detention time in the system to meet all EPA rules for SRT end temperature based on two digesters in series operation. During this stage the weir gate 26 (or other flow channel) between Digester 1 and the pre-mix basin 16 will be raised to prevent overflow to the pre-mix, and the weir gate between Digester 2 and the pre-mix 16 will be lowered so that flow will go back to the pre-mix prior to final thickening in the gravity thickener. This is post-thickened aerobic digester operation.

Arrows in FIG. 2, along with the tables above, give the order of flow in the mode of operation just described, for Stage I, Phase A or B. The arrow a indicates influent to the equalizer basin 18, while the arrow b indicates flow from the equalizer basin to Digester 1 (11). The arrow c indicates flow from Digester 1 to Digester 2, and the arrow d indicates flow over the downward operating weir gate 26 from Digester 2 into the pre-mix basin 16. The arrow e shows flow from the pre-mix into the gravity thickener 14, and the arrows f and g indicate supernatant back to head of plant, and finished product Class B from the thickener, respectively.

FIG. 3 schematically illustrates Stage II operation, for Phase B or C, the condition being about 6255 lbs./day to about 9500 lbs./day for a 3.0 MGD design flow, in this particular example. In this case, the system 10 can be operated fully in the P.A.D. G mode of operation. This is the operation described in the '220 patent referenced above. The only difference here is that the inflow is first fed to the equalization basin 18 and then into the pre-mix basin 16, which can be done using an airlift or a mechanical pump as indicated at 35 in FIG. 1, or by other means. If a bypass pipe 27 is included rather than EQ 18, then inflow is directly to the premix via the inflow pipe 30. The rest of the operation is as described in the '220 patent. Arrows in FIG. 3 show that influent first enters the equalization basin, as indicated at the arrow a. From here, the flow is to the pre-mix basin as indicated by the arrow b. Mixing occurs here, with flow from the in-loop digester, as further discussed below. The mixed sludge is fed, as at arrow c, to the gravity thickener 14, where the sludge is thickened and denitrification occurs as in the P.A.D. G system. From the gravity thickener, as indicated by the arrows d, the flow is to the in-loop digester, either Digester 1 or Digester 2, the other digester being in isolation. Constant recycling takes place from the in-loop digester (shown as Digester 1 in FIG. 3) back to the pre-mix basin 16, until the target solids concentration is reached (2.5%–3.5% typically). This is indicated at the arrow e in Digester 1, and by the dashed-line arrow e in Digester 2, indicating the alternating in-loop/isolated status of the two digesters. The weir gate 26 of the in-loop digester is lowered for this recycling. The arrow f indicates supernatant from the gravity thickener back to head of plant, and the arrow g indicates finished product Class B, from the isolated digester, indicated currently as Digester 2, with a dashed-line arrow g shown for Digester 1.

Note that in FIG. 3 four blowers 28 are shown. Blower capacity is design-specific.

Even larger flows can be accommodated using the basic plant shown in FIGS. 1–3, if needed. For larger-capacity conversion, the gravity thickener 14 can be converted to a sludge holding tank, and pre-thickening can be done with mechanical thickeners, e.g. gravity belt thickeners (not shown). Higher sludge concentration would be needed in the digesters so that additional digesters would not be needed. Aeration requirements will be different, requiring modification.

As discussed above, the inclusion of an equalizer basin 18 in a system generally of the type shown in these drawings provides versatility for other situations as well, not necessarily involving a change of influent load over time. The system may receive influent from a sequential batch reactor, in which case the infeed is received in larger batches fewer times per day (e.g. eight times per day, assuming two SBRs), whereas the basic P.A.D. G system may be designed for receiving, e.g., twenty-four batches per day. Thus, such a system cannot operate with the large infrequent SBR batches received. The equalizer basin 18 is sized to receive and store at least one batch from the SBRs, and preferably stores about 3 hours to one day's flow. The system is then timed to re-feed these batches out in appropriate increments, over a period of time to the pre-mix basin 16 (and thus to the gravity thickener) until the next SBR batch is received. This solves the problem of the larger and less frequent batches fed from the SBRs, especially in the case of Stage II, P.A.D. G operation. The same procedure can be used for receipt of batches of septage, which is highly concentrated.

Another advantage of the invention, providing adaptability and versatility, is the equalization basin's ability to transfer infeed directly to one of the digesters, changing the mode of operation to series operation whenever the pre-mix basin and/or the gravity thickener basin are taken out of service for cleaning, servicing or other purposes. A simple bypass pipe is an alternative. This advantage is explained briefly above.

The inclusion of a pre-mix basin 16 is preferred but not essential. It normally connects directly to the gravity thickener basin, as by a large pipe. References herein and in the claims to delivery of wastewater or sludge to the gravity thickener, or recycling to the gravity thickener, or connection to or flow to the gravity thickener, etc., are to be understood as meaning either directly to the gravity thickener basin or to that basin via a pre-mix basin.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method of operating an aerobic digester sewage treatment system having two aerobic digesters and a gravity thickener basin, in varying conditions of influent flow into the system, comprising:

providing the system with an influent bypass capable selectively of delivering influent either to the gravity thickener basin or to one of the aerobic digesters, bypassing the gravity thickener basin, operating the system in different modes as follows: (a) at a lower influent flow by delivering influent via said influent bypass to a first of the digesters, where aerobic digestion occurs, and then to a second of the digesters in a series relationship of the digesters, and then from the second digester into the gravity thickener basin, where the aerobically digested sludge is thickened and supernatant liquid is removed; or (b) at a higher level of flow as a pre-thickened aerobic digestion system with gravity thickening and denitrification in the gravity thickener, influent sludge being delivered to the gravity thickener where thickening occurs, and then to an in-loop digester with the other digester isolated, and with recycling from the in-loop digester back to the gravity thickener basin until a desired solids content is reached in the in-loop digester.

2. The method of claim 1, wherein the influent bypass includes an equalization basin positioned to receive influent prior to the digesters or the gravity thickener basin, the equalization basin being capable selectively of delivery influent either to the gravity thickener basin or to one of the digesters.

3. The method of claim 1, wherein the system includes a premix basin connected directly to the gravity thickener basin, with all flow to the gravity thickener basin being first received in the premix basin.

4. The method of claim 3, wherein the step in (a) of delivering sludge from the second digester to the gravity thickener basin comprises lowering a weir gate between the digester and the pre-mix basin.

* * * * *